United States Patent [19]
Chang

[11] Patent Number: 6,009,662
[45] Date of Patent: Jan. 4, 2000

[54] COCKROACH-TRAP

[76] Inventor: Shih-Hsin Chang, 7-3 Floor, No.122, Omei Street, Wan Hua Dist., Taipei, Taiwan

[21] Appl. No.: 09/104,062

[22] Filed: Jun. 24, 1998

[30] Foreign Application Priority Data

Aug. 30, 1997 [TW] Taiwan ................................ 86214827

[51] Int. Cl.[7] .................................................. A01M 1/22
[52] U.S. Cl. .................................................... 43/112
[58] Field of Search ................................ 43/98, 107, 112

[56] References Cited

U.S. PATENT DOCUMENTS

| | | | |
|---|---|---|---|
| 1,972,180 | 9/1934 | Bowman | 43/112 |
| 2,030,310 | 2/1936 | McWilliams et al. | 43/112 |
| 2,307,163 | 1/1943 | Shea | 43/112 |
| 2,516,264 | 7/1950 | Sheehy | 43/112 |
| 2,558,080 | 6/1951 | Gardenhour | 43/112 |
| 4,074,456 | 2/1978 | Tidwell | 43/98 |
| 4,144,668 | 3/1979 | Darncharnjitt | 43/107 |
| 4,709,502 | 12/1987 | Bierman | 43/112 |
| 4,780,985 | 11/1988 | Coots | 43/98 |
| 4,914,854 | 4/1990 | Zhou et al. | 43/112 |
| 5,570,537 | 11/1996 | Black et al. | 43/112 |
| 5,632,115 | 5/1997 | Heitman | 43/112 |

FOREIGN PATENT DOCUMENTS

| | | | |
|---|---|---|---|
| 338762 | 7/1921 | Germany | 43/98 |
| 285413 | 3/1931 | Italy | 43/112 |
| 2107164 | 4/1983 | United Kingdom | 43/98 |

*Primary Examiner*—Michael J. Carone
*Assistant Examiner*—Darren W. Ark
*Attorney, Agent, or Firm*—Pro-Techtor International Services

[57] ABSTRACT

Disclosed is a cockroach-trap mainly including a box having a top cover and a bottom tray pivotally hinged together, a metal net spread over inner surfaces of the box and being formed by alternately and densely arranging conductors of different polarities, and an intermittent-high-voltage generating circuit electrically connected to two conductors extended from the metal net. The box is provided with at least one entrance which is not covered by the metal net. When the box is closed, two pin holes separately provided on the top cover and the bottom tray opposite to the hinges together form a socket to receive a plug connected to a power source, so that power can be supplied to the intermittent-high-voltage generating circuit for the circuit to generate intermittent high voltage on the metal net. Cockroaches entering into the closed box can be killed by the high voltage. The cockroach-trap is absolutely safe when the top cover is lifted from the bottom tray and no high voltage current can be supplied to the metal net.

3 Claims, 2 Drawing Sheets

COCKROACH-TRAP

BACKGROUND OF THE INVENTION

The present invention relates to a cockroach-trap, and more particularly to a cockroach-trap that uses intermittent-high-voltage electric net to kill cockroaches by electric shock and is absolutely safe to human.

An old way of capturing and killing cockroaches is to apply glue on sheets of paper and position the paper at places cockroaches most possibly appear. Cockroaches pass the paper and are glued to the paper. Such glued paper form hindrances in the house and is not safe in use because they are frequently carelessly stepped or touched by children.

Another old way is poisoned bait. However, it is proven cockroaches become poison-resistant after a period of time and the poisoned bait gradually lose it effect. Again, poisoned baits dispersedly positioned at corners in the house form another threat if they are unexpectedly swallowed by children. The poisoned baits are not safe in use, either.

There is an electronic cockroach catching box disclosed in Taiwanese Utility Model Patent No. 098407. The means includes a U-shaped box. A front opening of the box is provided with a barrier formed of staggered bars. An inclined passage behind the barrier extends inward and upward from the barrier. A fixed wall vertically extends downward from a top end of the passage. A grilled gate is provided at the front opening and a bait container and a cockroach body tray are provided at a rear portion of the box. Two side walls of the box are provided along their top edges respectively with a strip of rib and a strip of flange. A top cover is removably disposed between the ribs and the flanges on two side walls of the box. A folded edge is provided at a rear end of the top cover and a supporting edge at a front end thereof. A motor rotates a worm wheel at very slow speed. A plurality of supporting rods are connected at one end to one side of the worm wheel and at the other end to a circular disc opposite to the worm wheel. The supporting rods are provided with fixing grooves for winding conductors of different polarities therearound. The conductors of different polarities are alternately arranged around the supporting rods and are parallel to one another, so as to form an electric net on the supporting rods.

Following disadvantages are found in the above-described electronic cockroach catching box:

1. The electric net is very slowly rotated through a worm wheel controlled by a motor. The motor keeps continuous operation and consumes additional power.
2. The box has a completely open side from where a user might very possibly carelessly touch the electric net and be electrically shocked.
3. The box has very complicate structure and requires high manufacturing cost.
4. The user must lift the top cover to remove cockroach bodies from the box. Since the electric net of the box is still supplied with current when the top cover is lifted, the user is subject to the danger of being electrically shocked when trying to remove the cockroach bodies from the box.

It is therefore tried by the inventor to develop a cockroach-trap which kill cockroaches by intermittent high voltage and is very safe in use.

SUMMARY OF THE INVENTION

A primary object of the present invention is to provide a cockroach-trap which includes an intermittent-high-voltage generating electric net to kill cockroaches entering the trap and can be used in an absolutely safe manner.

Another object of the present invention is to provide a cockroach-trap which has simple structure and can therefore be manufactured at reduced cost.

A further object of the present invention is to provide a cockroach-trap which intermittently generates high voltage to kill cockroaches and will therefore minimize power consumption thereof.

To achieve the above and other objects, the cockroach-trap of the present invention mainly includes a box having a top cover and a bottom tray pivotally hinged together, a metal net spread over inner surfaces of the box and being formed by alternately and densely arranging conductors of different polarities, and an intermittent-high-voltage generating circuit electrically connected to two conductors extended from the metal net. The box is provided with at least one entrance which is not covered by the metal net. When the box is closed, two pin holes separately provided on the top cover and the bottom tray opposite to the hinges together form a socket to receive a plug connected at another end to a power source, so that power can be supplied to the intermittent-high-voltage generating circuit for the circuit to generate intermittent high voltage on the metal net. Cockroaches entering into the closed box can be killed by the high voltage. The cockroach-trap is absolutely safe when the top cover is lifted from the bottom tray and no high voltage current can be supplied to the metal net.

BRIEF DESCRIPTION OF THE DRAWINGS

The above and other objects, the features, and the functions of the present invention can be best understood by referring to the following detailed description of the preferred embodiment and the accompanying drawings, wherein.

DETAILED DESCRIPTION OF THE PREFERRED EMBODIMENT

Figure 1:
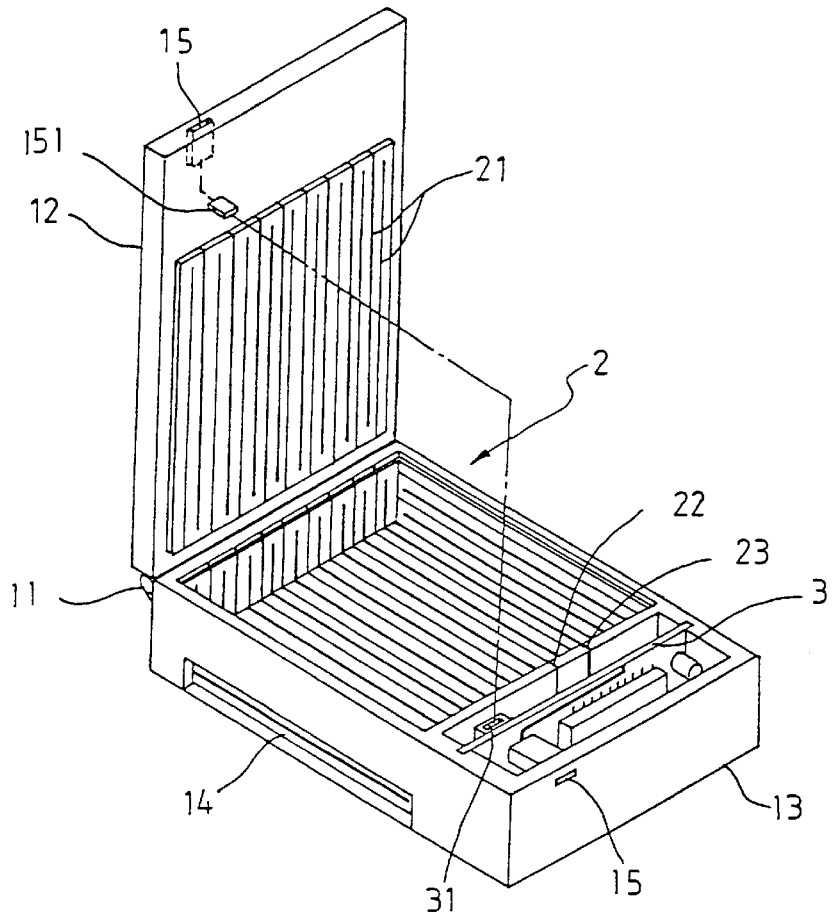
FIG. 1 is a perspective showing the structure of the present invention.
Figure 2:
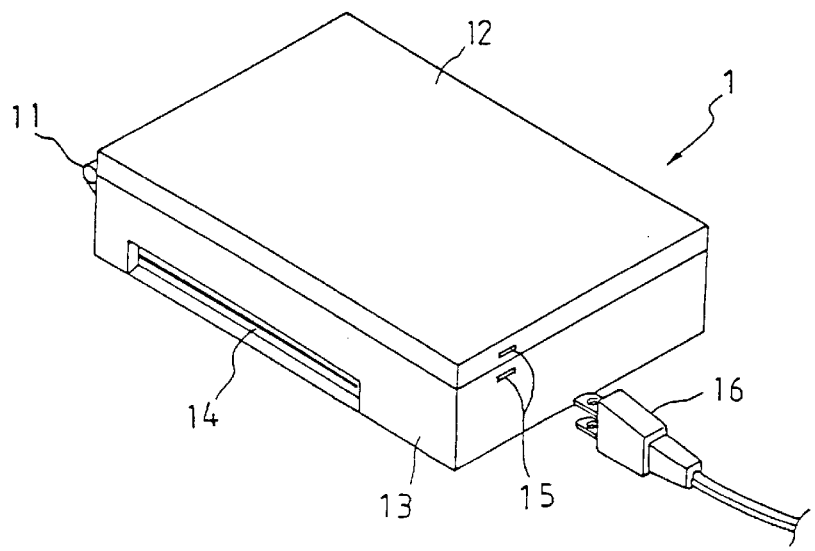
FIG. 2 is a perspective showing the present invention in a closed state ready for operation.

Please refer to FIGS. 1 and 2 which are perspective views of the cockroach-trap according to the present invention in open and closed states, respectively. As shown, the cockroach-trap is a box-like body 1 having a metal net 2 spreading over inner surfaces thereof. The metal net 2 is formed from alternately and densely arranged conductors of different polarities. The two conductors of different polarities are electrically connected to an intermittent-high-voltage generating circuit 3 in the cockroach-trap.

The box-like body 1 of the cockroach-trap includes a top cover 12 and a bottom tray 13 pivotally connected at one end to the top cover 12 by means of hinges 11. At least one entrance 14 is provided on the box-like body 1. Two pin holes 15 are separately provided on the top cover 12 and the bottom tray 13 at one end opposite to the hinges 11. When the top cover 12 is closed to the bottom tray 13, these two pin holes 15 together form a socket for a plug 16 to insert thereinto and supply power to the cockroach-trap. The pin hole 15 on the top cover 12 is electrically connected to an internal insertion plate 151 which is inserted into a receiving slot 31 preformed for the intermittent-high-voltage generating circuit 3 and is therefore electrically connected to the circuit 3. The pin hole 15 on the bottom tray 13 is also electrically connected to the circuit 3 via a conductor.

The metal net 2 is spread over entire inner surfaces of the box-like body 1 except where the entrance 14 is formed. The metal net 2 is formed by alternately and densely arranging metal wire conductors 21 of different polarities. The metal wire conductors 21 on the top cover 12 and the bottom tray 13 facing each other always have the same polarity. Two of the metal wire conductors having different polarities are extended from the metal net 2 to electrically connect to the intermittent-high-voltage generating circuit 3. These two extended metal wire conductors are generally indicated by numerals 22 and 23.

The intermittent-high-voltage generating circuit 3 obtains its power supply via the two pin holes 15 on the top cover 12 and the bottom tray 13. When the circuit 3 is supplied with power, intermittent high voltage can be generated on the metal net 2 via the two conductors 22, 23.

To supply power to the cockroach-trap of the present invention, the top cover 12 must be closed to the bottom tray 13 for the plug 16 to plug into the pin holes 15. In other words, when the top cover 12 is pivotally lifted from the bottom tray 13, the cockroach-trap is in an absolutely disconnected state and is therefore absolutely safe to all people.

Figure 3:
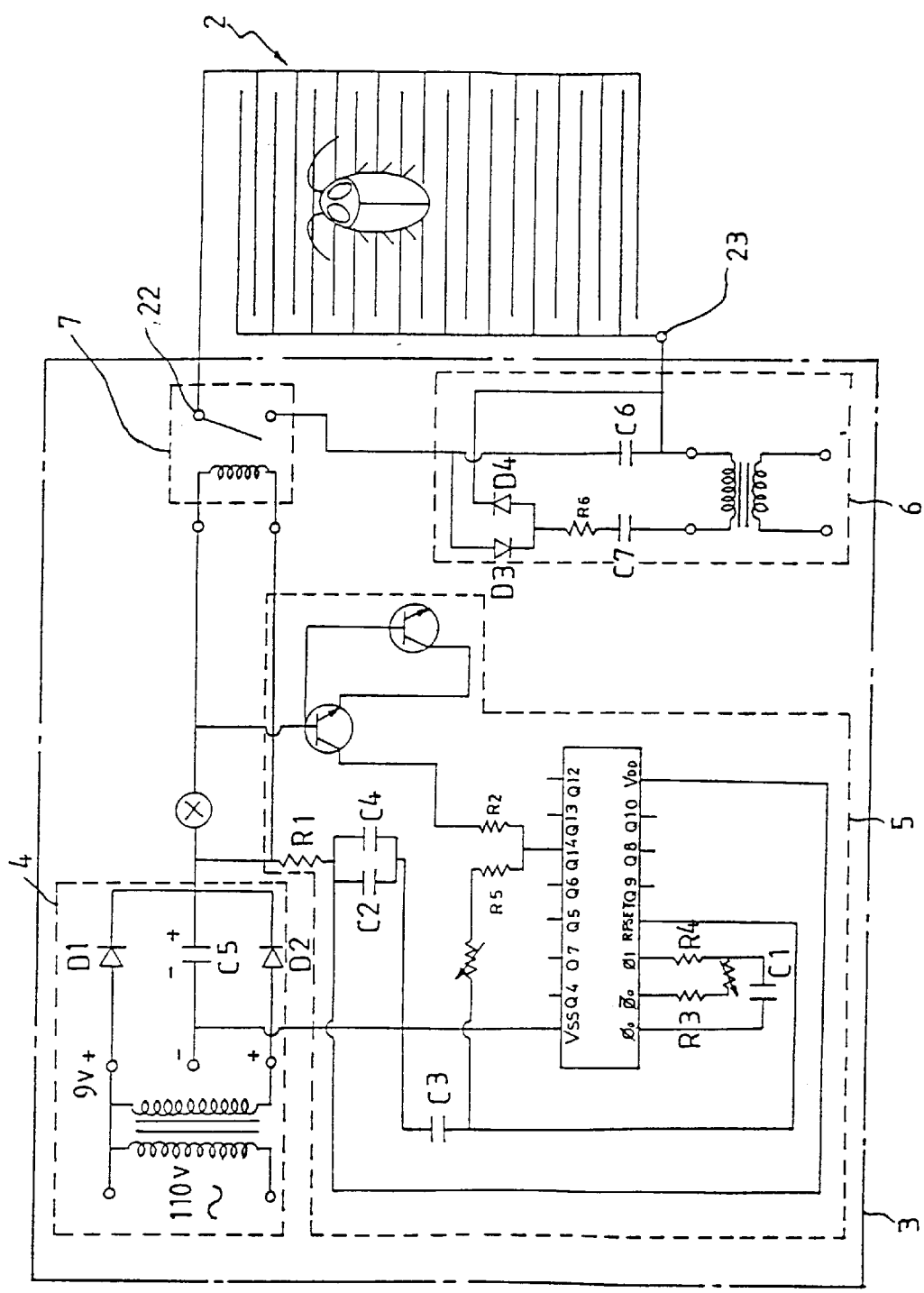
FIG. 3 is a circuit diagram showing the intermittent-high-voltage generating circuit of the present invention.

Please refer to FIG. 3 which is a circuit diagram showing the intermittent-high-voltage generating circuit of the present invention. As shown, the circuit 3 is enabled by supplying 110V alternating current of city electricity to it. To do so, the top cover 12 is closed to the bottom tray 13 and the plug 16 is plugged into the pin holes 15. The circuit 3 further includes a power supply circuit 4, a timer control circuit 5, a voltage increase circuit. 6, and a relay 7. A part of the 110V alternating current is directly supplied to the voltage increase circuit 6 while another part of the current is supplied to a voltage transformer of the power supply circuit 4 to output a low voltage. The low voltage is rectified, stabilized, and filtered to supply a +9V working voltage to the timer control circuit 5. The timer control circuit 5 controls the energizing of the relay 7 to decide the close or open of the circuit 3. The relay 7 has two contacts separately electrically connected to the voltage increase circuit 6 and to the conductor 22 of the metal net 2. Another conductor 23 of the metal net 2 is electrically connected to the voltage increase circuit 6. When the timer control circuit 5 is timing, the relay 7 is energized at the same time and its contacts are short-circuited. At this point, current supplied to the voltage increase circuit 6 flows through the conductors 22, 23 to the metal net 2. At this point, any conductive subject touching any two adjacent metal wire conductors 21 of the metal net 2 (that is, electrically connecting positive and negative electrodes of the metal net 2) shall cause current from the voltage increase circuit 6 to flow through and electrically shock the conductive subject with the high voltage of the current. When a preset time is reached and the timer control circuit 5 stop outputting any signal, the relay 7 is de-energized and its two contacts recover to their home positions, and current flowing through the voltage increase circuit 6 recovers to its normal condition.

The timer control circuit 5 is responsible for intermittently enabling or disabling of the intermittent-high-voltage circuit 3. In a preferred embodiment of the present invention, time intervals for intermittently enabling and disabling the circuit 3 is 10 to 30 seconds and 1 to 10 minutes, respectively. During the 1 to 10 minutes of disabling the circuit 3, no high voltage current will flow to the metal net 2. This non-current period allows any bait or bodies of cockroaches previously killed by the high voltage in the trap to allure other cockroaches to enter the box-like body 1 via the entrance 14. And, during the 10 to 30 seconds of circuit enabled period, high voltage is generated to kill the cockroaches in the trap.

Experiments have been conducted and prove the intermittent intervals of 10 to 30 seconds of enabling and 1 to 10 minutes of disabling of the circuit 3 are most preferred intervals. Continuous high-voltage current will only alarm cockroaches getting close the entrance 14 and being locally electrically shocked at their front legs, for example, and results in escaped cockroaches.

Since cockroaches like black or dark brown color, the box-like body 1 of the present invention may be painted in dark color to more effectively allure the cockroaches to enter the box. When a cockroach enters and is killed in the trap, other cockroaches will keep approaching the trap for food or hiding. The trap of the present invention may therefore successfully function even if no bait is provided in the trap. Following are Advantages of the Present Invention 1. Only the metal net is supplied with intermittent high-voltage current. No other power will be unnecessarily consumed and wasted.
2. Only one or more entrances with adequate dimensions for cockroaches are provided on the cockroach-trap of the present invention. No other large opening is formed on the trap that is large enough for a user to touch and be electrically shocked by the metal net.
3. The cockroach-trap has simple structure and can be manufactured at reduced cost.
4. To remove any cockroach body from the trap, the plug 16 must be unplugged before the top cover 12 can be lifted. That is, cockroach bodies can be removed only when the metal net of the trap is electrically disconnected and no accident of electric shock to the user shall occur.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A cockroach-trap comprising a box-shaped body, a metal net, and an intermittent-high-voltage generating circuit;

said box-shaped body including a top cover and a bottom tray pivotally connected at one end to said top cover by hinges, at least one entrance being formed in said box-shaped body and two pin holes being separately provided at the other another end of said top cover and said bottom tray opposite to said hinges, such that when said top cover is closed onto said bottom tray, said two pin holes together form a socket for a plug to plug thereinto;

said metal net being spread over entire inner surfaces of said top cover and said bottom tray except where said at least one entrance is provided, said metal net being formed by alternately and densely arranging metal wire conductors of different polarities, said metal wire conductors on said top cover and said bottom tray which face each other always having the same polarity, and two of said metal wire conductors having different polarities being extended from said metal net to electrically connect to said intermittent-high-voltage generating circuit; and said said intermittent-high-voltage generating circuit being supplied with power to intermittently generate high voltage in said metal net by closing said top cover onto said bottom tray and plugging a plug into said two pin holes on said top cover and said bottom tray;

whereby said cockroach-trap can be supplied with current to generate intermittent high voltage only when said box-shaped body is in a closed state for a plug to plug into said two pin holes, and said cockroach-trap is in a disconnected and absolutely safe state when said top cover is lifted from said bottom tray.

2. A cockroach-trap as claimed in claim 1, wherein said intermittent-high-voltage generating circuit is set to be intermittently enabled to generate high voltage for a time period from 10 to 30 seconds each time.

3. A cockroach-trap as claimed in claim 1, wherein said intermittent-high-voltage generating circuit is set to be intermittently disabled for a time period from 1 to 10 minutes each time.

\* \* \* \* \*